United States Patent [19]

Lange

[11] Patent Number: 5,363,323

[45] Date of Patent: Nov. 8, 1994

[54] POWER SUPPLY WITH PLURAL OUTPUTS SUPPLYING DYNAMIC AND STEADY LOADS

[75] Inventor: Gerhard G. Lange, Apalachin, N.Y.

[73] Assignee: International Business Machines Corporation, Armonk, N.Y.

[21] Appl. No.: 105,091

[22] Filed: Aug. 11, 1993

[51] Int. Cl.⁵ .................................... H02M 3/335
[52] U.S. Cl. ........................................ 363/21
[58] Field of Search ............... 363/21, 20, 67, 69, 363/78, 79; 323/267; 307/83

[56] References Cited

U.S. PATENT DOCUMENTS

| | | | |
|---|---|---|---|
| 4,058,758 | 11/1977 | Peterson | 363/80 |
| 4,419,723 | 12/1983 | Wilson, Jr. | 363/21 |
| 4,660,136 | 4/1987 | Montorefano | 363/26 |
| 4,679,132 | 7/1987 | Jirka | 363/21 |
| 4,884,180 | 11/1989 | Hoffmann | 363/21 |
| 5,005,112 | 4/1991 | Kuriyama | 363/21 |
| 5,036,452 | 7/1991 | Loftus | 363/71 |
| 5,117,347 | 5/1992 | Rebello et al. | 361/21 X |

Primary Examiner—Kristine L. Peckman
Assistant Examiner—Ed To
Attorney, Agent, or Firm—Arthur J. Samodovitz; William H. Steinberg

[57] ABSTRACT

A plural output power supply comprises a converter transformer having a first primary winding and first and second secondary windings. A first DC output circuit is driven by the first secondary winding and comprises a first series rectifier, a first series inductor wound on a first core and a first parallel capacitor. A second DC output circuit is driven by the second secondary winding and comprises a second series rectifier, a second series inductor wound on a second core and a second parallel capacitor. A sense transformer or series resistor senses a current in the first primary winding of the converter transformer. Circuitry subtracts the current in the second secondary winding from current sensed from the primary winding. If the first DC output is used to drive the stable load and the second DC output is used to drive the noisy load, the difference in the two currents represents the stable current and is used to control the drive to the primary of the converter transformer.

11 Claims, 7 Drawing Sheets

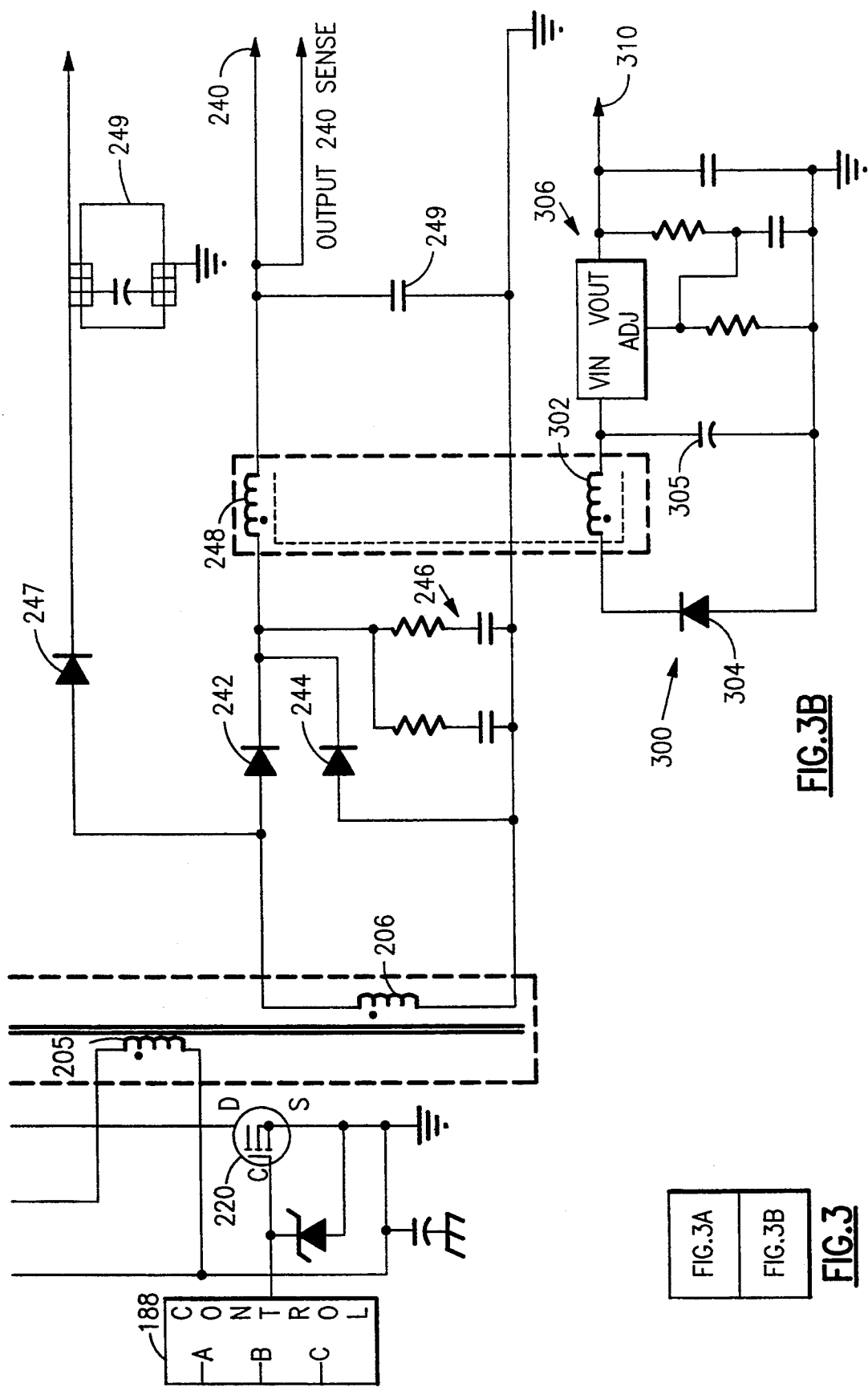

POWER SUPPLY WITH PLURAL OUTPUTS SUPPLYING DYNAMIC AND STEADY LOADS

BACKGROUND OF THE INVENTION

The invention relates generally to power supplies, and deals more particularly with a plural output power supply in which one output drives a highly transient or noisy load and another output must provide a highly stable voltage.

A previously known DC power supply comprises a transformer having a primary winding supplied by an AC source, and a full wave rectifier and low pass filter connected between a secondary winding of the transformer and the load to provide the DC voltage.

FIG. 1 illustrates a more complicated, plural output power supply with a current mode control according to the prior art. A voltage source 10 is supplied to a primary winding 11 of a current sense transformer 12 and a series primary winding 13 of a converter transformer 14. Each of the transformers has its own core. The voltage source 10 can either be an AC source or a DC source (as shown) which is "chopped" by a switch 52 to yield an AC excitation. The transformer 14 has three secondary windings 22, 23 and 24 which are used to generate three respective DC outputs as follows. Each of the secondary windings 22-24 passes a portion of the AC source to a respective pair of rectifiers (diodes) 30,31, 34,35 and 36,37 and respective low pass filters 32, 36, and 38 to yield respective DC outputs 40, 44 and 46. Each of the low pass filters comprises a series inductor and a parallel capacitor. All three of the inductors of the low pass filters 32, 36, and 38 are wound around the same magnetic core so they are electromagnetically coupled to each other. This coupling, along with the coupling due to winding of all secondary windings 22-24 around the same core of transformer 14, tends to cause all of the DC outputs 40, 44 and 46 to vary proportionally to each other with load changes.

Sense transformer 12 includes a secondary winding 26. The output from the sense secondary winding 26 is rectified by rectifier 47 and develops a rectified voltage across a resistor 48. The voltage corresponds to the total current drawn by all loads and is fed back to a control circuit 50. Control circuit 50 compares this voltage to a reference voltage to control a duty cycle of switch 52 as follows. When the rectified voltage exceeds the reference voltage, the control circuit shuts off switch 52 and the drive to primary winding 13 until the beginning of the next cycle. The duty cycle controls the magnitudes of the DC output voltages. Thus, the feedback and control 50 directly regulate the output 46 and indirectly regulate outputs 40 and 44 through cross coupling.

While this prior art power supply is effective in providing three DC outputs with overcurrent protection, cross regulation and line rejection, the coupling may not always be desirable, particularly if one of the loads is subject to highly transient or noisy conditions and another requires a low noise output. For example, if one of the DC outputs drives a motor which inherently produces large transients, and another of the DC outputs drives a noise sensitive device such as a video or other electronic circuit, the noise from the motor transients will adversely be coupled to the noise sensitive electronic circuit. While it is possible to insert an additional "post" regulator between the noisy load and its DC output or between the stable load and its DC output, each additional regulator wastes power and space. Also, the noisy load may trigger the overload protection too frequently and deprive the electronic circuit of needed power. It is also possible to use additional stages of low pass filtering to better block some of the transients.

Accordingly, a first object of the present invention is to provide a plural output power supply which can better isolate a noisy load from a more sensitive load and has overload protection that is generally insensitive to the noisy load.

Another object of the present invention is to provide a plural output power supply of the foregoing type which can also provide two or more cross coupled outputs.

Another object of the present invention is to provide a plural output power supply of the foregoing types which can provide substantial isolation without additional regulation.

SUMMARY OF THE INVENTION

The invention resides in a plural output power supply comprising a converter transformer having a first primary winding and first and second secondary windings. A first DC output circuit is driven by the first secondary winding and comprises a first series rectifier, a first series inductor wound on a first core and a first parallel capacitor, A second DC output circuit is driven by the second secondary winding and comprises a second series rectifier, a second series inductor wound on a second core and a second parallel capacitor. A sense transformer or series resistor senses a current in the first primary winding of the converter transformer. Circuitry subtracts the current in the second secondary winding from current sensed from the primary winding. If the first DC output is used to drive the stable load and the second DC output is used to drive the noisy load, the difference in the two currents represents the stable current and is used to control the drive to the primary of the converter transformer.

According to other features of the present invention, the converter transformer may include a third secondary winding which drives a third DC output circuit for another stable load. The third DC output circuit includes a third series rectifier, a third series inductor wound on the first core and a third parallel capacitor. Thus, the third DC output circuit is closely coupled to the first DC output circuit.

According to another feature of the present invention, the total current to all loads represented by the current sensed from the primary of the converter transformer is also used to control the drive current to the primary of the converter transformer, but only when the total current exceeds a relatively high reference (compared to that used for the difference current).

DETAILED DESCRIPTION OF THE PREFERRED EMBODIMENTS

Figure 1:
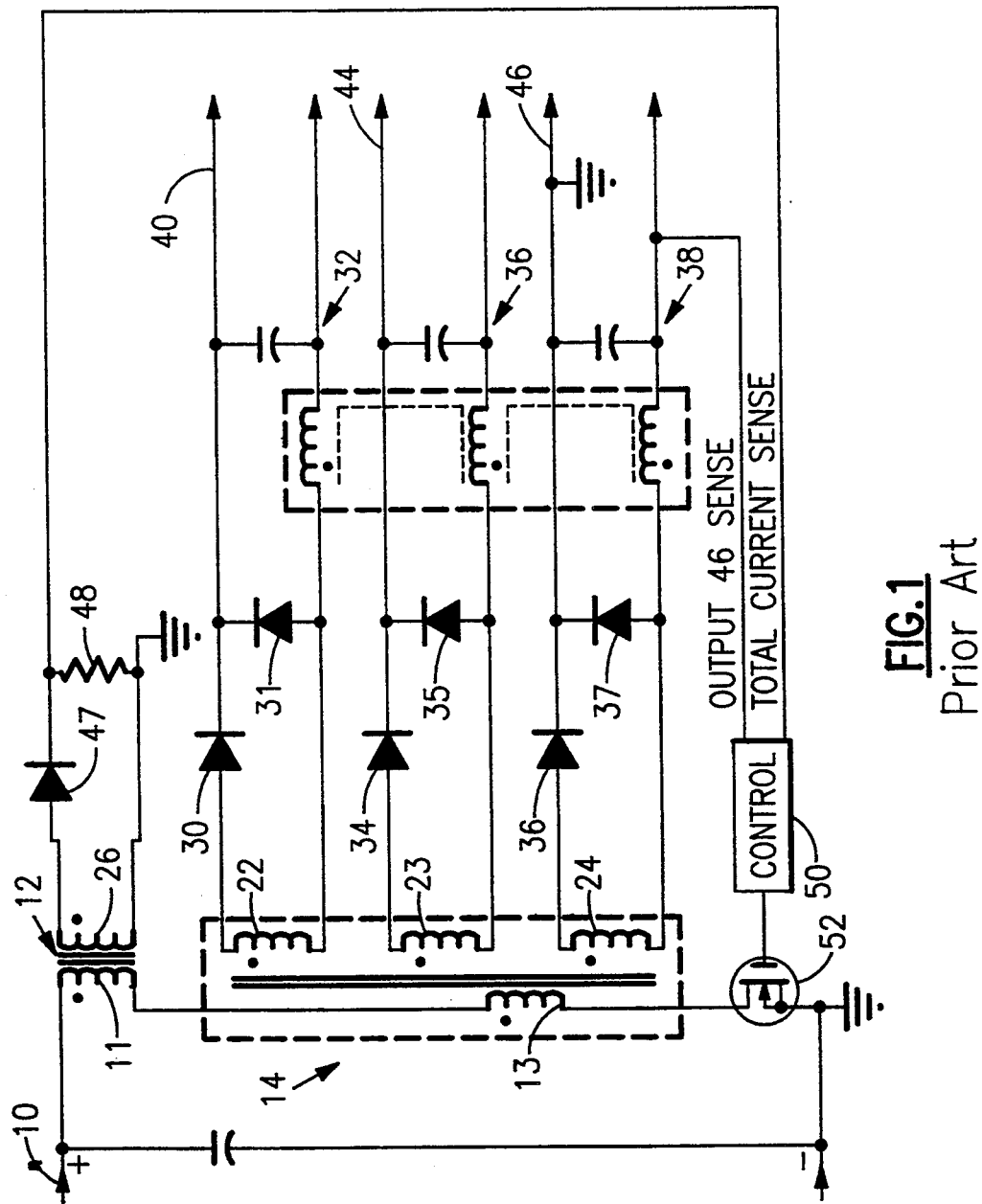
FIG. 1 is a circuit diagram of a power supply according to the Prior Art.
Figure 2:
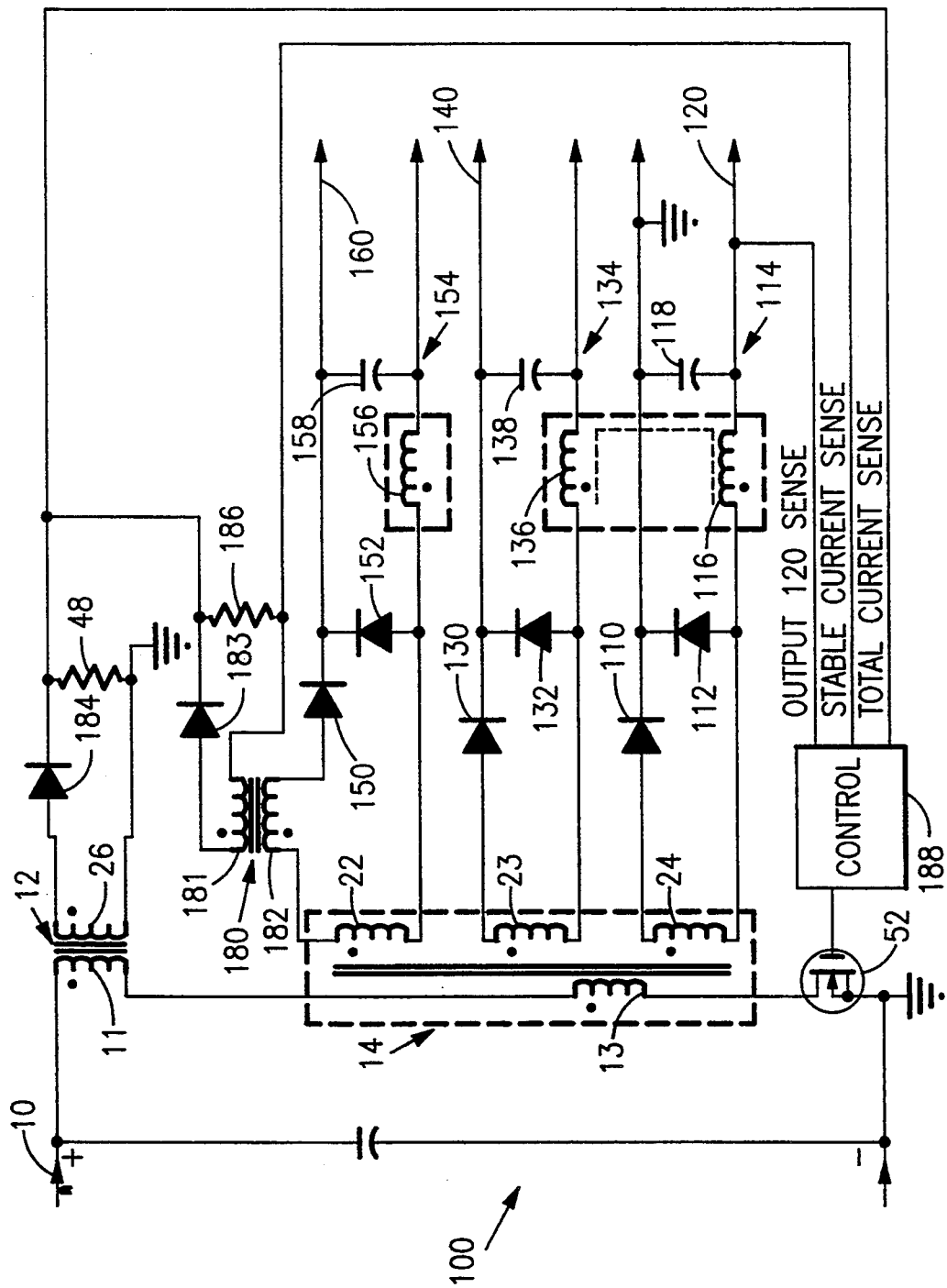
FIG. 2 is a circuit diagram of a power supply according to the present invention.

FIG. 2 illustrates a power supply generally designated 100 according to the present invention. Power supply 100 utilizes the voltage source 10, switch 52 and transformers 12 and 14 of the prior art, although transformers with different turns ratios and different numbers of secondary windings could also be used. Two rectifiers 110 and 112 and a low pass filter 114 comprising series inductor 116 and parallel capacitor 118 convert the AC output of secondary winding 24 to DC output 120. Similarly, two rectifiers 130 and 132 and a low pass filter 134 comprising series inductor 136 and parallel capacitor 138 convert the AC output of secondary winding 23 to DC output 140. Inductors 116 and 136 are coupled to each other, i.e. are wound around the same magnetic core. Consequently, the DC outputs 120 and 140 are cross-coupled to each other and both preferably drive stable loads. Two rectifiers 150 and 152 and a low pass filter 154 comprising series inductor 156 and parallel capacitor 158 convert the AC output of secondary winding 22 to DC output 160. Inductor 156 is wound around its own core and is not coupled to either inductor 116 or 136. Thus, if DC outputs 120 and 140 drive stable loads, DC output 160 can be used for a highly transient or noisy load with minimal effect (or "cross-coupling") on DC outputs 120 and 140.

Power supply 100 also comprises another transformer 180 having a secondary winding 181 and a primary winding 182 which is connected in series with the secondary winding 22 of transformer 14. Thus, the primary winding 182 passes all the current that supplies DC output 160 and such current is proportionally reflected in the secondary winding 181. The output from secondary winding 181 is rectified by diode 183 and develops a voltage across a resistor 186 representative of the current through secondary winding 22. The current in secondary winding 26 represents the total current drawn by all loads, is rectified by diode 184 and develops a voltage across a resistor 48. Because of the opposing polarities of secondary windings 26 and 181, the voltage developed by secondary 181 is subtracted from the voltage developed by secondary winding 26 to indicate the stable current from DC outputs 120 and 140. The resultant voltage is applied to a control circuit 188 which compares it to a first reference voltage to control the duty cycle of switch 52 as follows. When the feedback exceeds the reference voltage, the control circuit 188 shuts off switch 52 until the beginning of the next cycle to directly regulate DC output 120 and indirectly regulate output DC output 140. Thus, the current drawn from DC output 160 which drives the highly transient or noisy load is not considered by controller 188 in its comparison to the first reference. The rectified output from secondary winding 26, which is proportional to the total drive current for all DC outputs 120, 140 and 160 is also passed directly to control 188 (as the total current sense) and compared to a second, higher reference. If this threshold is exceeded, then control 188 shuts off switch 52. However, if the highly transient or noisy load instantaneously draws a large surge of current, the control 188 will not shut off switch 52 and therefore will not reduce DC outputs 120 and 140 unless the surge is so high as to cause the total current sense to exceed the second, higher reference.

Figure 3A:
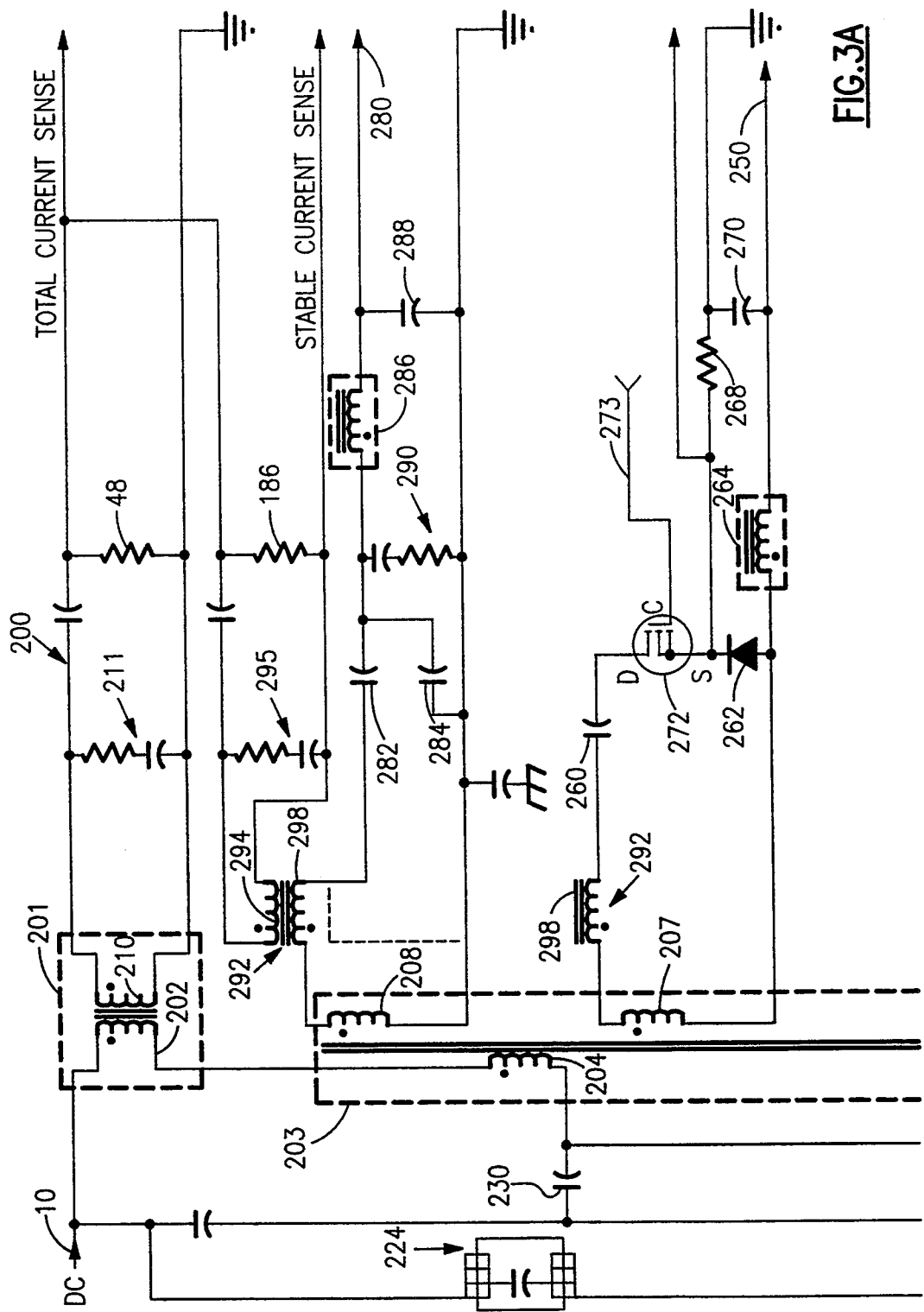
FIG. 3 is a circuit diagram of another power supply according to the present invention.

FIG. 3 illustrates another power supply generally designated 200 according to another embodiment of the present invention. Power supply 200 comprises a sense transformer 201 having a primary winding 202 and also comprises a converter transformer 203 having a series primary winding 204 and reset winding 205. Voltage source 10 for the primaries of transformers 201 and 203 can be provided by a DC source and a chopper transistor 220 (as shown) or an AC source. A multi-layer ceramic capacitor 224 provides high frequency decoupling for the voltage source. Another capacitor 230 provides overshoot reduction when chopper transistor 220 is shut off.

Transformer 203 also has three secondary windings 206, 207 and 208 which are used to develop DC outputs 240, 250 and 280, respectively. DC output 240 is provided from secondary 206 by rectifiers 242 and 244, RC damping circuit 246, series inductor 248 and parallel capacitor 249. Series inductor 248 is magnetically coupled only to inductor 302 (which is for a stable load) so DC output 240 is preferably used for a stable load. A series diode 247 and capacitor 249 provide internal operating power for control 188.

DC output 250 is provided from secondary 207 by rectifiers 260 and 262, series inductor 264, sense resistor 268 and parallel capacitor 270. A switch 272 can be operated in either of two modes by control line 273. In a first mode, the switch 272 is shut-off when the load is overdrawn. In a second mode, the switch is (current mode) pulse width modulated to regulate the DC output 250.

DC output 280 is provided from secondary 208 by rectifiers 282 and 284, series inductor 286 and parallel capacitor 288. An RC circuit 290 provides damping.

Sense transformer 201 also includes a secondary winding 210. The output from secondary winding 210 is proportional to the total current through primary winding of transformer 203 and drawn by all DC outputs 240, 250, 280 and 310. (An RC circuit 211 provides damping.) The output from secondary winding 210 develops a voltage across resistor 48 which is compared in control 188 to a relatively high threshold, and if exceeded, switch 220 is shut off to terminate the power into transformer 203. In this embodiment of the present invention, DC outputs 280 and 250 are used for noisy loads, and the load current from both are not considered in the stable current sense. Thus, power supply 200 comprises another transformer 292 which includes two primary windings 297 and 298 which pass the current output from secondary windings 207 and 208, respectively (representative of the current delivered by DC outputs 250 and 280, respectively) and induce proportional currents in a secondary winding 294. The resultant current develops a voltage across a resistor 186. Secondary winding 294 is connected in series with secondary winding 210 and polarized such that the voltage developed by secondary winding 294 representing the highly transient loads are subtracted from the voltage developed by secondary 210 representing the total current. Consequently, the current drawn by DC outputs 250 and 280 including the large transient currents is not considered in the stable current sense which is compared in control 188 to the relatively low reference. Consequently, switch 220 is not shut off and DC output 240 is not reduced when the highly transient load surges unless the total current sense exceeds the relatively high reference. (RC circuit 295 provides damping.)

FIG. 3 also illustrates another optional DC output circuit 300 comprising an inductor 302 which is wrapped around the same core as inductor 248. Consequently, inductors 248 and 302 form a transformer with inductor 248 being the primary winding and inductor 302 being the secondary winding; power in secondary winding 206 indirectly supplies power to DC output circuit 300. The AC current in secondary winding 302 is rectified by diode 304 and filtered by capacitor 305 to produce a DC output 310 by a series dissipative regulator 306. By way of example, series dissipative regulator 306 utilizes a Linear Technology Corp. part #LT137 and regulates a 10% voltage swing on the input to a 2% voltage swing at the output.

Figure 4:
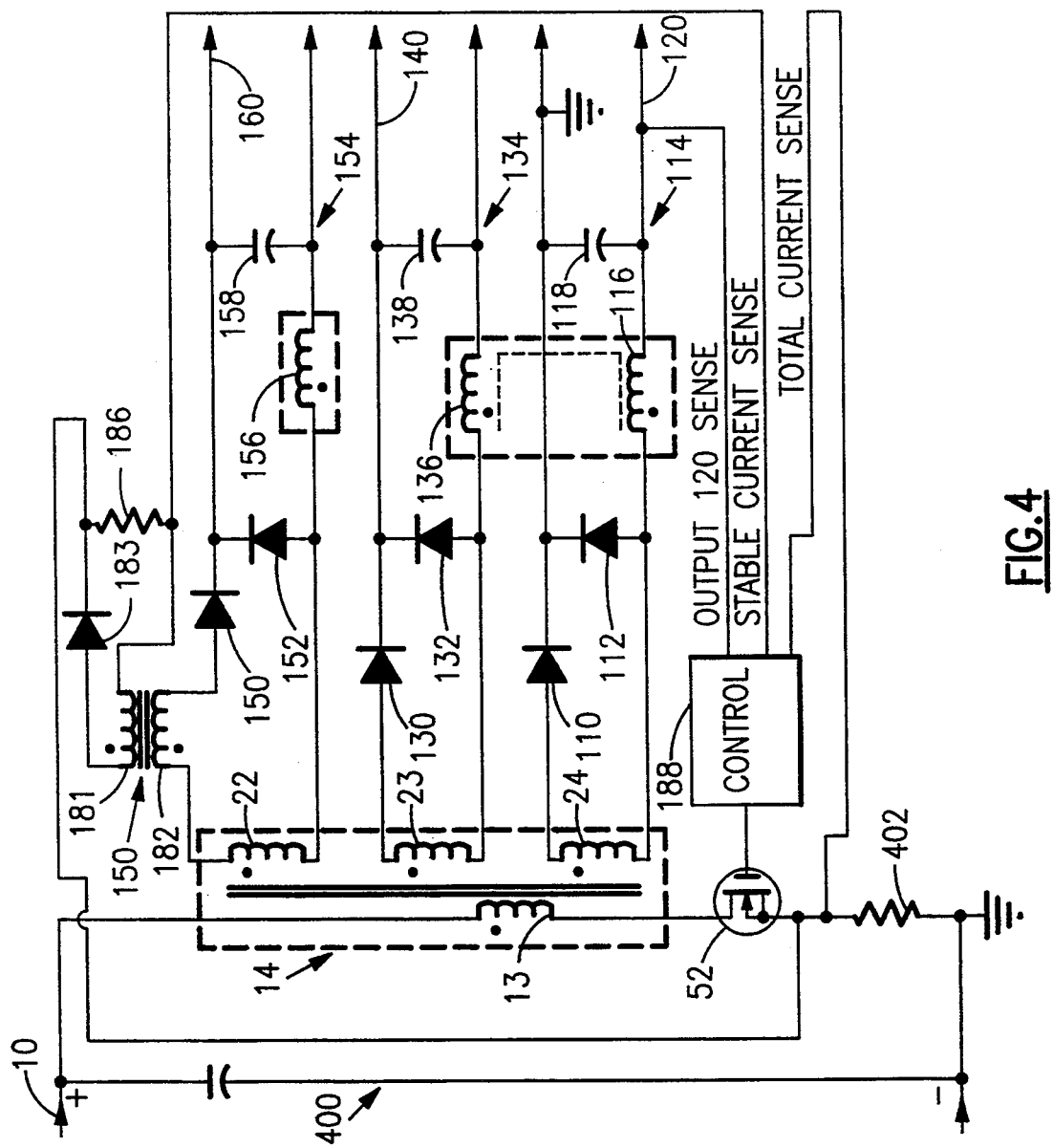
FIG. 4 is a circuit diagram of another power supply according to the present invention.

FIG. 4 illustrates another plural output power supply generally designated 400 according to the present invention. Power supply 400 is identical to power supply 100 except sense transformer 12 of power supply 100 is replaced by a series, low ohmic sense resistor 402. The voltage developed across sense resistor 402 is proportional to the current through the primary of converter transformer 14 and is supplied to control 188 as the total current sense. Also, the voltage developed by secondary 181 across resistor 186 representing the current through transient load 160 is subtracted from the voltage developed across sense resistor 402 to yield the stable current sense for control 188.

Figure 5:
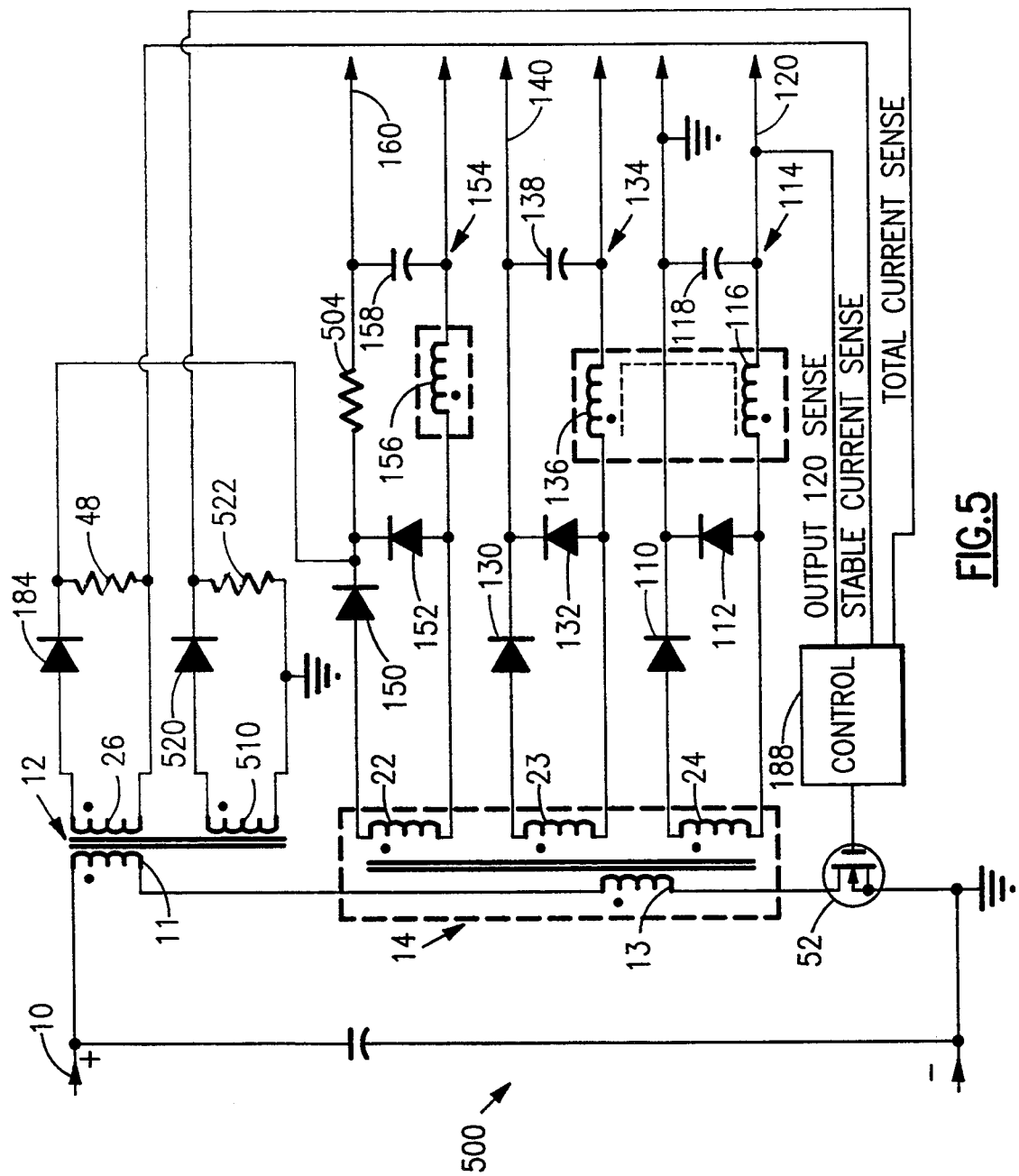
FIG. 5 is a circuit diagram of another power supply according to the present invention.

FIG. 5 illustrates another plural output power supply generally designated 500 according to the present invention. Power supply 500 is identical to power supply 100 except transformer 180 of power supply 100 is omitted. Instead, one end of the secondary 26 of sense transformer 12 is connected to the cathode of diode 150 and a small resistor 504 is added between the cathode of diode 150 and DC output 160. Also, the other end of secondary 26 of sense transformer 12 is connected to control 188. Consequently, a voltage representing the current from transient output 160 subtracts from the voltage across resistor 48 representing the total current to yield the stable current sense.

Also, another secondary winding 510 is provided in sense transformer 12. The current induced into secondary winding 510 is rectified by diode 520 and develops a voltage across a resistor 522 to yield the total current sense.

Figure 6:
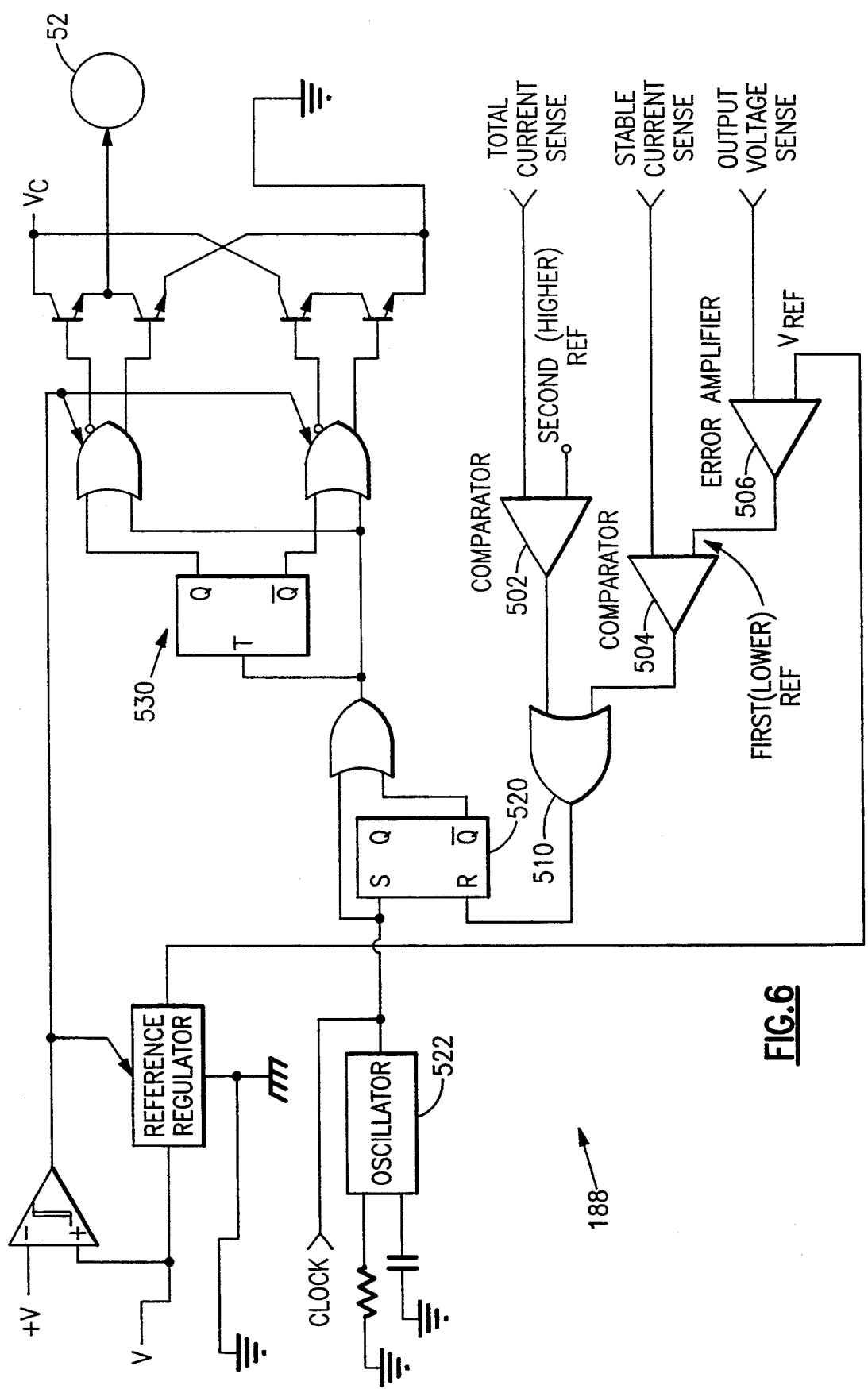
FIG. 6 is a block diagram of a controller within the power supplies of FIGS. 2–5.

FIG. 6 illustrates the control 188 within each of the power supplies 100, 200, 400 and 500. Control 188 comprises a comparator 502 with a relatively high reference voltage for the total current sense, a comparator 504 with a relatively low reference voltage for the stable current sense, and an amplifier 506 to generate the relatively low reference voltage based on the output voltage sense. The outputs of comparators 502 and 504 are supplied to inputs of an OR gate 510, and the output of OR gate 510 is supplied to a reset input of a flip flop 520. An oscillator 522 supplies the set input of flip flop 520. The output of flip flop 520 triggers a driver circuit 530. Much of control 188 is provided by Silicon General Corporation part #SG 1825. In normal operation, oscillator 522 sets the flip flop 520 at the beginning of a cycle. In response, the output of the flip flop 520 triggers the driver circuit 530 to turn-on switch 52. The total current sense and/or the stable current sense exceed their respective voltage reference and reset the flip flop 520 to shut off the switch 52. At the beginning of the next cycle, the oscillator sets the flip flop 520 to again turn on switch 52. Thus, the total and stable current senses affect the duty cycle of switch 52 and thereby act to control the amount of power delivered to the converter transformer and the magnitude of the DC outputs.

Based on the foregoing, multiple output power supplies according to the present invention have been disclosed. However, numerous modifications and substitutions can be made without deviating from the scope of the present invention. For example, different values of components can be used for different applications. If desired, secondary winding 23, rectifiers 130 and 132, low pass filter 134 and DC output 140 of FIG. 2 can be omitted. Alternately, one or more additional secondary windings, pairs of rectifiers, low pass filters and DC outputs can be included having a low pass filter inductor which is magnetically coupled to any other low pass filter inductor(s) or magnetically isolated from all other low pass filter inductors depending on whether cross coupling is appropriate. Low pass filter inductors of noisy loads should not be magnetically coupled to low pass filter inductors of stable loads, but low pass filter inductors of noisy loads can be magnetically coupled to low pass filter inductors of other noisy loads. Therefore, the invention has been disclosed by way of illustration and not limitation, and reference should be made to the following claims to determine the scope of the present invention.

I claim:

1. A power supply comprising:
 a first transformer having a first primary winding and first and second secondary windings;
 a first DC output circuit driven by said first secondary winding and comprising a first series rectifier, a first series inductor wound on a first core and a first parallel capacitor;
 a second DC output circuit driven by said second secondary winding and comprising a second series rectifier, a second series inductor wound on a second core and a second parallel capacitor;
 means for sensing a current in said first primary winding of said first transformer;
 means for subtracting a current in said second secondary winding from the current sensed from said primary winding; and
 means for controlling a drive current to said first primary winding based on the difference between said current in said second secondary winding and said current sensed from said primary winding.

2. The power supply of claim 1, wherein said means for controlling a drive current further comprises means for comparing said difference to a threshold, with said drive current being interrupted when said threshold is exceeded.

3. A power supply comprising:
 a first transformer having a first primary winding and first and second secondary windings;
 a first DC output circuit driven by said first secondary winding and comprising a first series rectifier, a first series inductor wound on a first core and a first parallel capacitor;
 a second DC output circuit driven by said second secondary winding and comprising a second series rectifier, a second series inductor wound on a second core and a second parallel capacitor;
 a second transformer having a second primary winding and a third secondary winding, said second primary winding being in series with said first primary winding of said first transformer;

a third transformer having a third primary winding and a fourth secondary winding, said third primary winding being in series with said second secondary winding, said fourth secondary winding being in series with said third secondary winding and polarized such that current in said fourth secondary winding is subtracted from current in said third secondary winding; and means for controlling a drive current to said first primary winding based on the difference between said currents from said third and fourth secondary windings.

4. A power supply as set forth in claim 3 wherein said first transformer further comprises a fifth secondary winding; and further comprising a third DC output circuit driven by said fifth secondary winding and comprising a third series rectifier, a third series inductor wound on said first core and a third parallel capacitor.

5. A power supply as set forth in claim 3 wherein the controlling means also controls said drive current based on total current output from said third secondary winding.

6. A power supply as set forth in claim 3 wherein:

said first transformer further comprises a fifth secondary winding; and further comprising a third DC output circuit driven by said fifth secondary winding and comprising a third series rectifier, a third series inductor and a third parallel capacitor; and said third transformer further includes a fourth primary winding in series with said fifth secondary winding and polarized to induce a current in said fourth secondary winding which subtracts from said current in said third secondary winding.

7. A power supply as set forth in claim 3 wherein the controlling means shuts off said drive current when said difference exceeds a threshold.

8. A power supply comprising:

a first transformer having a first primary winding and first and second secondary windings;

a first DC output circuit driven by said first secondary winding and comprising a first series rectifier, a first series inductor wound on a first core and a first parallel capacitor;

a second DC output circuit driven by said second secondary winding and comprising a second series rectifier, a second series inductor wound on a second core and a second parallel capacitor;

a second transformer having a second primary winding and a third secondary winding, said second primary winding being in series with said first primary winding of said first transformer, said third secondary winding being electrically coupled to said second secondary winding and polarized such that current in said second secondary winding is subtracted from current in said third secondary winding; and means for controlling a drive current to said first primary winding based on the difference between said currents from said second and third secondary windings.

9. The power supply of claim 8, wherein said means for controlling a drive current further comprises means for comparing said difference to a threshold, with said drive current being interrupted when said threshold is exceeded.

10. A power supply comprising:

a first transformer having a first primary winding and first and second secondary windings;

a first DC output circuit driven by said first secondary winding and comprising a first series rectifier, a first series inductor wound on a first core and a first parallel capacitor;

a second DC output circuit driven by said second secondary winding and comprising a second series rectifier, a second series inductor wound on a second core and a second parallel capacitor;

a sense resistor in series with said first primary winding of said first transformer;

a second transformer having a second primary winding and a third secondary winding, said second primary winding being in series with said second secondary winding, said third secondary winding being coupled to said sense resistor such that current in said third secondary winding is subtracted from current in said sense resistor; and means for controlling a drive current to said first primary winding based on the difference between said currents from said third secondary winding and said sense resistor.

11. The power supply of claim 10, wherein said means for controlling a drive current further comprises means for comparing said difference to a threshold, with said drive current being interrupted when said threshold is exceeded.

* * * * *